Oct. 9, 1945.　　　F. E. FISHER　　　2,386,673
WINDING SLOT WEDGE
Filed June 10, 1944

Inventor:
Frederick E. Fisher,
by Harry E. Dunham
His Attorney.

Patented Oct. 9, 1945

2,386,673

UNITED STATES PATENT OFFICE 2,386,673

WINDING SLOT WEDGE

Frederick E. Fisher, Scotia, N. Y., assignor to General Electric Company, a corporation of New York Application June 10, 1944, Serial No. 539,763

6 Claims. (Cl. 171—252)

My invention relates to wedges for closing the winding slots of dynamoelectric machines or the like.

Wedges of magnetic material and particularly wedges formed of laminated magnetic material have substantial electrical advantages when used to close or partially close the slots of dynamoelectric machines. This type wedge, however, has presented mechanical difficulties of complicated assembly of the laminations and of holding the wedges in assembled relationship when in place in the slots of a dynamoelectric machine.

An object of my invention is to provide an improved transversely laminated wedge for a dynamoelectric machine winding slot.

Another object of my invention is to provide an improved magnetic wedge in which laminations are formed by folding a strip of magnetic material so that the folds of the material form transverse laminations.

A further object of my invention is to provide an improved method of making a laminated winding slot wedge.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
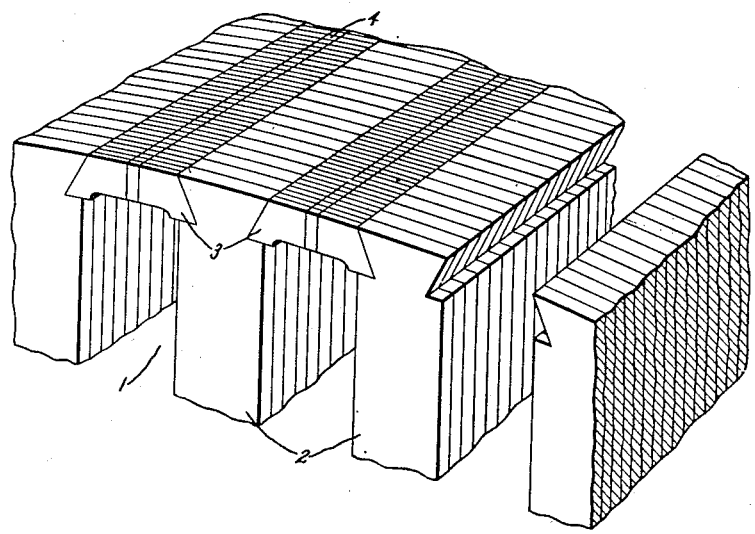
Figure 2:
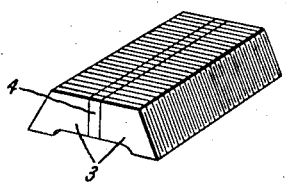
Figure 3:
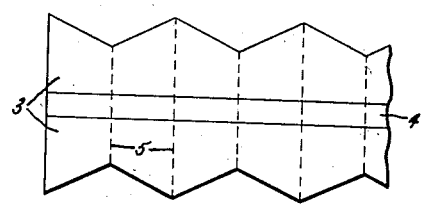
Figure 4:
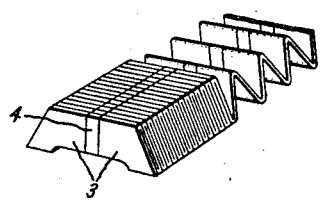

In the drawing, Fig. 1 is a perspective view of a part of a dynamoelectric machine showing winding slots and an embodiment of my improved wedge construction in position in some of the winding slots; Fig. 2 is a perspective view of one of my improved magnetic slot wedges; Fig. 3 is a view of a sheet strip from which a wedge may be formed; and Fig. 4 is a perspective view showing a partially folded and assembled wedge.

Referring to the drawing, I have shown an embodiment of my invention applied to a magnetic wedge of the type which is adapted to be used to retain a winding in position in winding slots 1 of a laminated dynamoelectric machine core 2 of magnetic material. These wedges are formed as composite members and comprise a sheet strip which is formed by rolling two magnetic material strip portions 3, as shown in Fig. 3, which are integrally connected to a non-magnetic metal sheet strip 4 arranged between the inner edges of the magnetic portions 3. The composite sheet strip is then cut or punched to the desired width for the wedge and folded transversely along the dotted lines 5, also shown in Fig. 3, to form transversely extending folds, as shown in Fig. 4, which provide transversely extending laminations of the desired depth of wedge. If it is desired that the shape of the wedge be slightly different, the assembled unit, as shown in Fig. 2, may be held by a proper jig and finished to the desired shape, or the profile may be punched to the desired shape and then assembled. This provides a wedge having a plurality of transversely extending laminations of magnetic material arranged on each side thereof integrally connected together by a nonmagnetic metal portion arranged intermediate the inner edges of the magnetic portions. This assembly is then coated with an adhesive substance, such as a suitable enamel, which enters the spaces between folds by capillary action, and then is baked while held under compression. With such a construction, the two magnetic side parts of the wedge are securely held together and spaced apart by the non-magnetic strip of material, thereby providing an improved wedge construction in which the magnetic portions will not become separated during use of the equipment and which may be formed by a simple and improved method of manufacture.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A wedge for dynamoelectric machine winding slots which includes a plurality of laminations of magnetic material extending transversely of said wedge along each side thereof, and a laminated non-magnetic metal portion arranged transversely intermediate said laminated magnetic material laminations and integrally connected to each of said magnetic material laminations.

2. A magnetic wedge comprising side portions of magnetic material having laminations extending transversely thereof, and means including a non-magnetic material portion integrally connected to each of said laminated magnetic portions extending between the inner faces of said laminated side portions for joining said side portions together.

3. A magnetic wedge having a plurality of laminations extending transversely of the length of said wedge, said laminations comprising folded sections of a strip of sheet material including a longitudinally extending non-magnetic material central portion with a longitudinally extending magnetic material portion on each side of said central portion.

4. A magnetic wedge having a plurality of laminations extending transversely of the length of said wedge, said laminations comprising folded sections of a strip of material including a longitudinally extending non-magnetic metal portion with a longitudinally extending magnetic material portion on each side of said non-magnetic portion and integrally connected thereto.

5. The method of making a dynamoelectric machine winding slot wedge which comprises forming a composite sheet strip of two magnetic material strip portions integrally connected together by a non-magnetic metal strip portion arranged intermediate said magnetic portions, and transversely folding said composite sheet strip into transversely extending laminations formed by the folds of said strip of desired depth of wedge with a magnetic portion on each side thereof and the non-magnetic portion forming the intermediate part of the wedge.

6. The method of making a dynamoelectric machine winding slot wedge which comprises forming a composite sheet of two magnetic material strip portions integrally connected together by a non-magnetic metal strip portion arranged intermediate said magnetic portions, forming said composite sheet into a strip of desired width, and transversely folding said composite strip sheet into a slot wedge shape of transversely extending laminations formed by the folds of said strip with a magnetic portion on each side thereof and the non-magnetic portion forming the central part of the wedge.

FREDERICK E. FISHER.